United States Patent Office 3,126,255
Patented Mar. 24, 1964

3,126,255
METHOD OF PREVENTING CAKING OF AMMONIUM SULPHATE AND POTASSIUM SULPHATE
Edward Graham Cooke, Bunbury, Tarporley, England, and Leslie Phoenix, Llay, Wrexham, Wales, assignors to Imperial Chemical Industries Limited, Millbank, London, England, a corporation of Great Britain
No Drawing. Filed July 3, 1961, Ser. No. 121,361
Claims priority, application Great Britain July 15, 1960
6 Claims. (Cl. 23—119)

This invention relates to ammonium sulphate and potassium sulphate in substantially crystalline form, either separately or together, and to compositions containing one or both of these salts in admixture with one or more other substances.

More particularly the invention relates to reducing the tendency which these salts, or mixtures containing one or both of them, have of agglomerating, or caking as it is generally termed, when stored for any length of time, either in bulk or in bags.

According to the present invention there are provided substantially non-caking compositions of crystalline ammonium sulphate and of potassium sulphate, either separately or together, or in admixture with one or more other substances, which comprise the desired salt or salts, with or without other substances and incorporated therewith a proportion by weight in the range of 0.0001% to 0.1% of an additive selected from cerium compounds, thorium compounds, cobalt compounds, and iron compounds capable of giving ferric ions in solution, the said proportion being calculated on the weight of the salt or salts and other substances present.

Additives which are particularly effective in the compositions of the present invention comprise:

(1) Ceric sulphate
    Ceric oxide
    Ceric hydroxide
    Cerous nitrate
    Ammonium ceric sulphate
    Ammonium ceric nitrate (2) Thorium nitrate
    Thorium sulphate
    Ammonium thorium nitrate
    Ammonium thorium sulphate (3) Cobalt nitrato-pentamine nitrate,
    $[Co(NH_3)_5NO_3](NO_3)_2$
    Trinitrato-cobalt triamine complex,
    $(NH_3)_3Co(NO_3)_3$
    Cobalt nitrate
    Cobalt sulphate (4) Ferric chloride
    Ferrous sulphate
    Ammonium ferrous sulphate
    Ammonium ferric sulphate The desired additive may be incorporated with the salt or salts and other substance or substances by any suitable means and preferably by such means that will ensure a substantially uniform distribution of the additive over the surfaces of the particles of the composition. For example the additive may be dissolved in water and the resulting solution sprayed on the particles, preferably while the latter are being agitated, for example in a tumbler drum or paddle mixer. To obtain the best results the solution of the additive sprayed on the particles should be as concentrated as possible and the resulting composition is preferably dried thereafter, although such drying is not essential as the additives of the present invention are effective even with moist compositions containing ammonium sulphate and/or potassium sulphate.

The desired additive may however be incorporated in finely divided dry form with the salt or salts and other substance or substances in any suitable "dry" mixer, and when treating ammonium sulphate or potassium sulphate or mixtures of these only it may be added to a slurry of the salt crystals and mother liquor while this is being passed through a pipe-line to a filter in which the salt crystals are to be separated. Alternatively the additives may be passed into a crystalliser in which the salts are being crystallised from mother liquor.

The invention is illustrated by the following examples:

EXAMPLE 1

1000 kilograms of ammonium sulphate of 0.1 mm. to 0.3 mm. crystal size range were sprayed with a solution of 100 grams of ferric chloride dissolved in 10 litres of water. The spraying operation was carried out while the ammonium sulphate was being transported on a conveyor belt.

The salt was then passed through by conveyors and bucket elevators to a hot air dryer where the water was removed.

After leaving the dryer the salt was cooled and stored for two months in a warehouse, after which time it was found to be still free flowing, whereas another 1000 kilograms of ammonium sulphate, similarly produced and stored, but not treated with ferric chloride, had caked.

EXAMPLE 2

1000 kilograms of ammonium sulphate of 0.1 mm. to 0.3 mm. crystal size range were sprayed with a solution of 10 grams of ammonium ceric nitrate dissolved in 20 litres of water. The spraying operation was carried out as described in Example 1 above. The salt was also dried in a similar manner and then stored in an enclosed hopper for three months.

On opening the simple sliding valve beneath this hopper, the treated ammonium sulphate flowed out reasonably freely. In order to make untreated ammonium sulphate, which had been stored in a similar hopper for a like period, flow out of the hopper it was necessary to continuously knock the walls of the hopper with a hammer and at times to insert a poker into the valve outlet in order to clear caked salt away from it.

EXAMPLE 3

1000 kilograms of ammonium sulphate was treated with 100 grams of ammonium ceric sulphate in the manner described in Example 1.

The dried treated ammonium sulphate was then packed into 1 cwt. paper bags, and these were stored in a warehouse for four months.

On opening the bags the treated salt was found to flow freely out of them whereas similarly stored untreated salt would not. The untreated salt had to be hammered to break up the hard lumps which formed.

EXAMPLE 4

1 kilogram of finely powdered ferric chloride was intimately mixed with 1000 kilograms of ammonium sulphate crystals of 0.1 mm. to 0.5 mm. crystal size range. The mixing was carried out in a double helical ribbon mixer.

The treated ammonium sulphate was found not to cake on storage in a bin for one month, whereas untreated salt was found to have caked hard when stored under similar conditions.

EXAMPLE 5

1 kilogram samples of ammonium sulphate of 0.1 mm. to 0.3 mm. crystal size were taken and each was sprayed with 20 millilitres of an aqueous solution or slurry containing 5% of a posible anti-caking agent.

The treated samples were then well mixed to ensure that the posible anti-caking agent under test was well dispersed throughout the kilogram sample.

Two small cakes of ammonium sulphate each of 300 grams were then made from each 1 kilogram sample, using a small mould to do this. The resulting duplicated sets of cakes were then allowed to dry out by leaving them for four days in a desiccating chamber containing silica gel, after this period of time one set of cakes was then tested in the following manner.

*Cake Dropping Test*

Each cake was carefully picked up (if this was possible) and allowed to fall on to a hard concrete surface from a height of eighteen inches. The resulting debris was examined and classified as follows.

Class A__ Cake substantially unbroken (i.e. caked hard.)
Class B__ Cake broken into fewer than six major pieces.
Class C__ Cake broken into more than six pieces.
Class D__ Cake completely disintegrated.

If the cake was so fragile that it could not be picked up to carry out this test it was classified as class E.

*Finger Prodding Test*

The other set of cakes was examined by prodding with the fingers in order to assess the degree to which caking had occurred. The cakes were classified as follows.

Class 1_____ Caked hard, cannot be easily broken up.
Class 2_____ Fairly hard cake, but can be broken using medium pressure.
Class 3_____ Soft cake.
Class 4_____ Cake very fragile.

The results of such tests on samples containing various additives are shown in the following table.

| Additive | Formula | Classification in dropping test | Classification in prodding test |
|---|---|---|---|
| Control (no additive) | | A | 1 |
| Effective additives: | | | |
| Ferric chloride | $FeCl_3$ | D | 4 |
| Ferrous sulphate | $FeSO_4$ | C | 3 |
| Ammonium ceric Nitrate | $(NH_4)_2[Ce(NO_3)_6]$ | E | 4 |
| Ammonium ceric sulphate | $(NH_4)_4[Ce(SO_4)_4]$ | E | 4 |
| Ceric hydroxide | $Ce(OH)_4$ | C | 3 |
| Ceric sulphate | $Ce(SO_4)_2$ | C | 3 |
| Cerous nitrate | $Ce(NO_3)_3$ | C | 3 |
| Ceric oxide | $CeO_2$ | B | 2 |
| Thorium nitrate | $Th(NO_3)_4$ | C | 3 |
| Thorium sulphate | $Th(SO_4)_2$ | C | 3 |
| Ammonium thorium nitrate | $(NH_4)_2[Th(NO_3)_6]$ | C | 3 |
| Ammonium thorium sulphate | $(NH_4)_4[Th(SO_4)_4]$ | C | 3 |
| Cobalt nitrate | $Co(NO_3)_2$ | C | 3 |
| Cobalt sulphate | $CoSO_4$ | B | 2 |
| Cobalt nitrato-pentamine nitrate | $[Co(NH_3)_5NO_3](NO_3)_2$ | C | 3 |
| Trinitrato-cobalt triamine complex | $(NH_3)_3Co(NO_3)_3$ | C | 3 |
| Ammonium ferric sulphate | $(NH_4)_2SO_4Fe_2(SO_4)_3$ | D | 4 |
| Ammonium ferrous sulphate | $(NH_4)_2SO_4FeSO_4$ | C | 3 |
| Ineffective additives: | | | |
| Cupric chloride | $CuCl_2$ | A | 1 |
| Zinc chloride | $ZnCl_2$ | A | 1 |
| Magnesium chloride | $MgCl_2$ | A | 1 |

EXAMPLE 6

1 kilogram samples of potassium sulphate of 0.05 mm. to 0.2 mm. crystal size were taken and each was sprayed with 20 millilitres of an aqueous solution or slurry containing 5% of a possible anti-caking agent.

The treated samples were then well mixed to ensure that the possible anti-caking agent under test was well dispersed throughout the kilogram sample.

Each sample was then made into a small cake and these cakes were allowed to dry out by leaving them for four days in a desiccating chamber containing silica gel. After this period of time the cakes were examined by prodding with the fingers and the degree of caking was assessed using a classification similar to that described in Example 5.

The results are given in the following table:

| Additive: | Classification in prodding test |
|---|---|
| Control (no additive) | 1 |
| Effective additives: | |
| Ferric chloride | 4 |
| Ferrous sulphate | 3 |
| Ammonium ceric nitrate | 4 |
| Ammonium ceric sulphate | 4 |
| Ceric hydroxide | 3 |
| Ceric sulphate | 3 |
| Cerous nitrate | 3 |
| Ceric oxide | 2 |
| Thorium nitrate | 3 |
| Thorium sulphate | 2 |
| Ammonium thorium nitrate | 3 |
| Ammonium thorium sulphate | 3 |
| Cobalt nitrate | 3 |
| Cobalt sulphate | 2 |
| Cobalt nitrato-pentamine nitrate | 3 |
| Trinitrato-cobalt triamine complex | 3 |
| Ammonium ferric sulphate | 4 |
| Ammonium ferrous sulphate | 3 |
| Ineffective additives: | |
| Cupric chloride | 1 |
| Zinc chloride | 1 |
| Magnesium chloride | 1 |

EXAMPLE 7

2 kilograms of ammonium sulphate of 0.1 mm. to 0.3 mm. crystal size were intimately mixed with 2 kilograms of potassium sulphate of 0.05 mm. to 0.2 mm. crystal size. The resulting 4 kilograms of mixture was divided into four equal samples and these were treated as follows.

Sample No.: Treatment
1_____ Sprayed with 20 millilitres of water, and made into small 300 gram cakes as described in Example 5.
2_____ Sprayed with 20 millilitres of a 5% aqueous solution of ferric chloride and made into cakes.
3_____ Sprayed with 20 millilitres of a 5% aqueous solution of ammonium ceric nitrate and made into cakes.
4_____ Sprayed with 20 millilitres of a 5% aqueous solution of ammonium ceric sulphate and made into cakes.

The cakes were then allowed to dry out over a period of four days and then examined using the tests described in Example 5 in order to assess the degree of caking which had occurred.

The results are given in the following table.

| Additive | Classification in dropping test | Classification in prodding test |
|---|---|---|
| Control (no additive) | A | 1 |
| Ammonium ceric sulphate | E | 4 |
| Ammonium ceric nitrate | D | 4 |
| Ferric chloride | D | 4 |

EXAMPLE 8

1 kilogram of potassium chloride of 0.1 mm. to 0.2 mm. crystal size was intimately mixed with 9 kilograms of ammonium sulphate of 0.1 mm. to 0.4 mm. crystal size. The resulting 10 kilograms of mixture was divided into four equal samples and these were sprayed in turn as described in the following paragraph.

Sample No.: Treatment
1 _____ Sprayed with 50 millilitres of water.
2 _____ Sprayed with 50 millilitres of a 5% aqueous solution of ferric chloride.
3 _____ Sprayed with 50 millilitres of a 5% aqueous solution of ammonium ceric nitrate.
4 _____ Sprayed with 50 millilitres of a 5% aqueous solution of ammonium ceric sulphate.

Using a small mould, 300 gram cakes were made from the four treated samples. These cakes were allowed to dry out over a period of five days and then examined using the tests described in Example 5 in order to assess the degree of caking which had occurred.

The results are given below.

| Additive Tested | Classification in dropping test | Classification in prodding test |
| --- | --- | --- |
| Control (no additive) | A | 1 |
| Ammonium ceric sulphate | E | 4 |
| Ammonium ceric nitrate | D | 4 |
| Ferric chloride | E | 4 |

EXAMPLE 9

1 kilogram of ammonium chloride of 0.1 mm. to 0.2 mm. crystal size, 1 kilogram of potassium chloride of 0.1 mm. to 0.2 mm. crystal size and 8 kilograms of ammonium sulphate of 0.1 mm. to 0.4 mm. crystal size were intimately mixed together. The resulting 10 kilograms of mixture was divided into four equal samples and these were sprayed in turn as described in the following paragraph.

Sample No.: Treatment
1 _____ Sprayed with 50 millilitres of water.
2 _____ Sprayed with 50 millilitres of a 5% aqueous solution of ferric chloride.
3 _____ Sprayed with 50 millilitres of a 5% aqueous solution of ammonium ceric nitrate.
4 _____ Sprayed with 50 millilitres of a 5% aqueous solution of ammonium ceric sulphate.

From the four treated samples 300 gram cakes were made, using a small mould. These cakes were allowed to dry out over a period of four days and then examined using the tests described in Example 5 in order to assess the degree of caking which had occurred.

The results are given below.

| Additive Tested | Classification in dropping test | Classification in prodding test |
| --- | --- | --- |
| Control (no additive) | B | 2 |
| Ammonium ceric sulphate | D | 4 |
| Ammonium ceric nitrate | D | 4 |
| Ferric chloride | D | 4 |

EXAMPLE 10

To ammonium sulphate of 0.5 mm. to 1.7 mm. crystal size there was added 0.001% by weight of ferrous sulphate by spraying as an aqueous solution of 10% concentration into the ammonium sulphate while the latter was being agitated.

Quantities of 50 kilograms of the treated ammonium sulphate were put into bags and stacked 20 bags high for a period of fourteen weeks. At the end of this period the ammonium sulphate in the undermost bags had formed into soft cakes only, while similar quantities of untreated ammonium sulphate stored in the same manner for the same period had formed into fairly hard cakes, requiring medium pressure to break them.

EXAMPLE 11

Two 5 kilogram samples of ammonium sulphate crystals (of 0.1 mm. to 0.5 mm. crystal size) were taken and one was sprayed with 100 millilitres of an aqueous solution containing 0.005 gram of ammonium ceric sulphate.

The other sample was sprayed with 100 millilitres of distilled water. Each of the wet samples was raked over in order to ensure that the solution and the water were well dispersed over the surface of the ammonium sulphate crystals.

Several small (300 g.) cakes of ammonium sulphate were made from each 5 kilogram sample, by the use of a small mould. These cakes were then allowed to dry out by leaving them for six days in a room where the relative humidity of the air was less than 50%.

After this period of time the cakes were gently placed one at a time below the needle of a penetrometer. A one and a half kilogram weight rested on a platform above the needle of this instrument, the needle being of square cross section and having an area of 9 square millimetres. The penetrometer needle and weight were allowed to fall freely through a distance of 1.7 centimetres before the point of the needle entered to ammonium sulphate cake.

The penetration distance was read off on a scale attached to the instrument and the results obtained for duplicate samples are recorded in the following table.

| Description of sample cakes tested | Needle penetration distance |
| --- | --- |
| Ammonium sulphate cakes made from distilled water. | (a) 10 millimetres. (b) 12 millimetres. |
| Ammonium sulphate cakes containing 0.0001% of ammonium ceric sulphate. | (a) 40 millimetres. (b) At least 54 millimetres (cake broken). |

We claim:
1. A substantially non-caking crystalline composition comprising salt selected from the group consisting of ammonium sulphate, potassium sulphate, and mixtures thereof, and from 0.0001% to 0.1% by total weight of salt of an additive selected from the group consisting of ceric sulphate, ceric oxide, ceric hydroxide, cerous nitrate, ammonium ceric sulphate and ammonium ceric nitrate.

2. A composition as claimed in claim 1 wherein said additive is ammonium ceric nitrate.

3. A composition as claimed in claim 1 wherein said additive is ammonium ceric sulphate.

4. A process for the preparation of a substantially non-caking crystalline composition containing salt selected from the group consisting of ammonium sulphate, potassium sulphate, and mixtures thereof, which comprises incorporating therein in a mixing zone an amount of from 0.0001% to 0.1% by total weight of salt of an additive selected from the group consisting of ceric sulphate, ceric oxide, ceric hydroxide, cerous nitrate, ammonium ceric sulphate and ammonium ceric nitrate.

5. A process as claimed in claim 4 wherein said additive is ammonium ceric nitrate.

6. A process as claimed in claim 4 wherein said additive is ammonium ceric sulphate.

References Cited in the file of this patent

UNITED STATES PATENTS

| 1,919,707 | Adam et al. | July 25, 1933 |
| 1,966,947 | Eyer et al. | July 17, 1934 |
| 2,030,583 | Haas | Feb. 11, 1936 |